United States Patent
Cheng et al.

(10) Patent No.: US 11,005,628 B2
(45) Date of Patent: May 11, 2021

(54) DEVICE, NETWORK, AND METHOD FOR WIDEBAND LTE SINGLE OFDM SYMBOL UPLINK TRANSMISSION

(71) Applicant: Futurewei Technologies, Inc., Plano, TX (US)

(72) Inventors: Qian Cheng, Aurora, IL (US); Weimin Xiao, Hoffman Estates, IL (US); Jialing Liu, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 156 days.

(21) Appl. No.: 15/206,219

(22) Filed: Jul. 8, 2016

(65) Prior Publication Data

US 2017/0041948 A1    Feb. 9, 2017

Related U.S. Application Data

(60) Provisional application No. 62/200,990, filed on Aug. 4, 2015.

(51) Int. Cl.
*H04L 5/00* (2006.01)
*H04L 27/26* (2006.01)

(52) U.S. Cl.
CPC .......... *H04L 5/0051* (2013.01); *H04L 5/0044* (2013.01); *H04L 5/0055* (2013.01); *H04L 5/0091* (2013.01); *H04L 27/2613* (2013.01); *H04L 27/2614* (2013.01); *H04L 5/0007* (2013.01)

(58) Field of Classification Search
None
See application file for complete search history.

(56) References Cited

U.S. PATENT DOCUMENTS

| | | | |
|---|---|---|---|
| 2005/0286408 A1 | 12/2005 | Jin et al. | |
| 2006/0098570 A1 | 5/2006 | Hadad | |
| 2006/0203765 A1* | 9/2006 | Laroia | H04W 28/22 370/328 |
| 2007/0087749 A1 | 4/2007 | Ionescu et al. | |
| 2007/0133462 A1* | 6/2007 | Guey | H04L 5/0048 370/330 |
| 2009/0010240 A1* | 1/2009 | Papasakellariou | H04L 5/0007 370/344 |

(Continued)

FOREIGN PATENT DOCUMENTS

| | | |
|---|---|---|
| CN | 1922810 A | 2/2007 |
| CN | 101263679 A | 9/2008 |

(Continued)

OTHER PUBLICATIONS

U.S. Appl. No. 62/162,557, filed May 2015, Jiang; Jing.*

(Continued)

*Primary Examiner* — Kodzovi Acolatse
*Assistant Examiner* — The Hy Nguyen
(74) *Attorney, Agent, or Firm* — Slater Matsil, LLP

(57) ABSTRACT

An embodiment method for managing uplink transmission includes dividing, by a network controller, frequency resources in a single OFDM symbol into two sets of frequency resources. The method further includes signaling, by the network controller, to a UE to transmit data in a first set of the frequency resources and to transmit a pilot signal in a second set of the frequency resources.

15 Claims, 8 Drawing Sheets

(56) References Cited

U.S. PATENT DOCUMENTS

| | | |
|---|---|---|
| 2009/0213723 A1 | 8/2009 | Noh et al. |
| 2009/0316636 A1* | 12/2009 | Medapalli ............... H04L 1/002 370/329 |
| 2009/0323515 A1* | 12/2009 | Ishikura ............... H04L 5/0007 370/210 |
| 2010/0098012 A1* | 4/2010 | Bala ...................... H04L 5/0053 370/329 |
| 2011/0249578 A1* | 10/2011 | Nayeb Nazar ........ H04L 1/0027 370/252 |
| 2013/0003694 A1 | 1/2013 | Choi et al. |
| 2014/0092793 A1* | 4/2014 | Yang ..................... H04B 7/2656 370/280 |
| 2015/0349995 A1* | 12/2015 | Zhang .................. H04L 5/0048 375/295 |
| 2015/0381399 A1 | 12/2015 | Taghavi Nasrabadi et al. |
| 2016/0087706 A1* | 3/2016 | Guey .................. H04L 27/2607 375/267 |
| 2016/0219569 A1* | 7/2016 | Kuo .................. H04W 74/0833 |
| 2016/0338081 A1* | 11/2016 | Jiang ................. H04W 72/1205 |
| 2017/0026992 A1* | 1/2017 | Jiang ................. H04W 72/1263 |

FOREIGN PATENT DOCUMENTS

| | | |
|---|---|---|
| CN | 101627596 A | 1/2010 |
| CN | 101953129 A | 1/2011 |
| CN | 103503395 A | 1/2014 |
| WO | 2013067345 A1 | 5/2013 |
| WO | 2014113546 A1 | 7/2014 |

OTHER PUBLICATIONS

LTE Advanced, "3rd Generation Partnership Project; Technical Specification Group Radio Access Network; Evolved Universal Terrestrial Radio Access (E-UTRA); Multiplexing and channel coding (Release 12)", 3GPP TS 36.212, V12.5.0, Jun. 2015, Technical Specification, 94 pages.

* cited by examiner

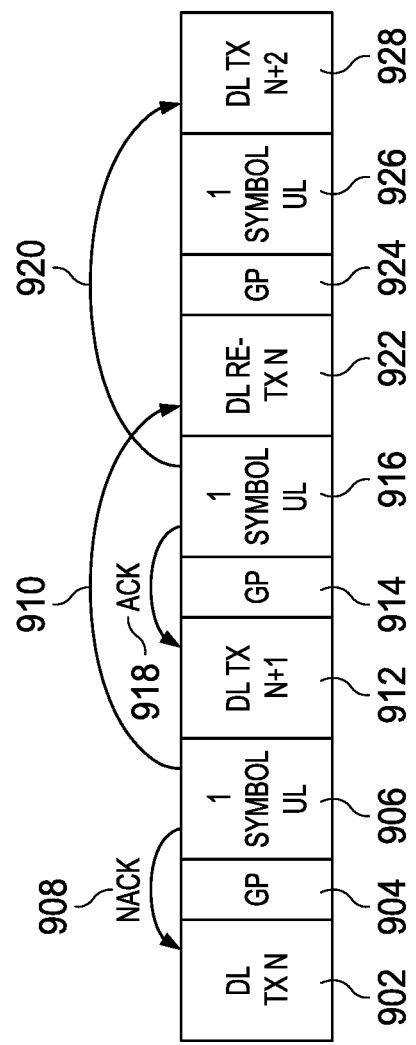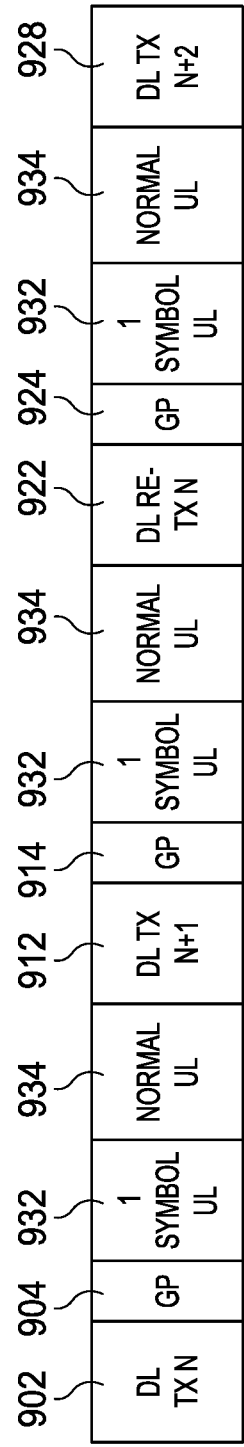

FIG. 9c

| 902 | 904 | 944 | 942 | 912 | 914 | 944 | 942 | 922 | 924 | 944 | 942 | 928 |
|---|---|---|---|---|---|---|---|---|---|---|---|---|
| DL TX N | GP | NORMAL UL | 1 SYMBOL UL | DL TX N+1 | GP | NORMAL UL | 1 SYMBOL UL | DL RE-TX N | GP | NORMAL UL | 1 SYMBOL UL | DL TX N+2 |

FIG. 9d

| 902 | 904 | 954 | 952 | 954 | 922 | 914 | 954 | 952 | 954 | 960 | 924 | 954 | 952 | 954 | 928 |
|---|---|---|---|---|---|---|---|---|---|---|---|---|---|---|---|
| DL TX N | GP | NORMAL UL | 1 SYMBOL UL | NORMAL UL | DL RE-TX N | GP | NORMAL UL | 1 SYMBOL UL | NORMAL UL | DL RE-TX N+1 | GP | NORMAL UL | 1 SYMBOL UL | NORMAL UL | DL TX N+2 |

DEVICE, NETWORK, AND METHOD FOR WIDEBAND LTE SINGLE OFDM SYMBOL UPLINK TRANSMISSION

This patent application claims priority to U.S. Provisional Application No. 62/200,990, filed on Aug. 4, 2015 and entitled "Device, Network, and Method for Wideband LTE Single OFDM Symbol Uplink Transmission," which is hereby incorporated by reference herein as if reproduced in its entirety.

TECHNICAL FIELD

The present invention relates generally to a device, network, and method for wireless communications, and, in particular embodiments, to a device, network, and method for wideband LTE uplink transmission through a single OFDM symbol.

BACKGROUND

The amount of wireless data has been growing at an unprecedented pace in the last few years, pushing the capacity of current macro cellular deployments. Cellular communications systems, which utilize microwave spectrum bands (300 megahertz (MHz) to 3 gigahertz (GHz)), are becoming limited in capacity due to interference and traffic load. The use of high frequency bands, where vast amounts of bandwidth are available, is considered to be a crucial technology for future generation communication systems. The use of these frequency bands (e.g., 5, 28, 38, 60 and 73 GHz) can help mitigate the currently observed capacity problem.

Large licensed spectrum in the 3.5 GHz C-band having about 400 to 800 MHz contiguous spectrum will be available in Europe and Japan by 2020 or earlier. For a high frequency band, larger sub-carrier spacing can be used due to increased propagation path loss and smaller coverage areas. Some numerology for the wider bandwidth with 60 kilohertz (kHz) subcarrier spacing is listed in Table 1 below.

TABLE 1

| Sample Rate (Msamp/s) | FFT Size | Max Bandwidth, MHz | Max Subcarriers |
|---|---|---|---|
| 30.72 | 512 | 20 | 300 |
| 61.44 | 1024 | 40 | 600 |
| 122.88 | 2048 | 80 | 1200 |
|  | 2048 | 120 | 1800 |
| 245.76 | 4096 | 160 | 2400 |
|  | 4096 | 240 | 3600 |
| 491.52 | 8192 | 320 | 4800 |

SUMMARY

An embodiment method for managing uplink transmission includes dividing, by a network controller, frequency resources in a single orthogonal frequency division multiplexing (OFDM) symbol into two sets of frequency resources, and signaling, by the network controller, to a user equipment (UE) to transmit data in a first set of the frequency resources and to transmit a pilot signal in a second set of the frequency resources.

An embodiment hybrid communications controller includes a processor and a non-transitory computer readable storage medium storing programming for execution by the processor. The programming includes instructions for dividing frequency resources in a single orthogonal OFDM symbol into two sets of frequency resources, and signaling a UE to transmit data in a first set of the frequency resources and to transmit a pilot signal in a second set of the frequency resources.

An embodiment method for uplink transmission includes transmitting, by a UE, data in a first set of frequency resources within a single OFDM symbol, and transmitting, by the UE, a pilot signal in a second set of frequency resources within the single OFDM symbol. The first set of frequency resources and the second set of frequency resources may be interleaved with one another such that an entire bandwidth available to the UE is covered by the two sets of frequency resources.

BRIEF DESCRIPTION OF THE DRAWINGS

For a more complete understanding of the present invention, and the advantages thereof, reference is now made to the following descriptions taken in conjunction with the accompanying drawing, in which:

FIGS. 9a-9d illustrate various single OFDM symbol uplink transmission configurations for different deployment scenarios;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In wideband Long Term Evolution (LTE) systems, increased subcarrier spacing results in shorter orthogonal frequency division multiplexing (OFDM) symbol duration. Also, to reduce packet round trip delay, a shorter transmit time interval in terms of fewer OFDM symbols may be employed in wideband LTE systems for earlier acknowledgement/negative acknowledgement (ACK/NACK) transmission. The combined effects of shorter OFDM symbol duration and fewer OFDM symbols in wideband LTE may make the uplink coverage a serious issue, since much less energy may be received at a user equipment (UE) for physical uplink control channel (PUCCH) reception. In legacy LTE uplink transmission, certain numbers of frequency resources at the edge of the system bandwidth reserved for PUCCH transmission make this situation even worse. The issue can be mitigated to some degree by uplink beamforming if the UE is equipped with multiple transmit antennas. But such a technique may not be helpful when PUCCH transmission suffers deep fading, since the fixed transmitting frequency resource prevents the UE from taking advantage of frequency selectivity.

To achieve low latency, more frequent uplink transmission carrying ACK/NACK may be desirable. In the legacy uplink transmission, each uplink subframe occupies 14 OFDM symbols, and if there is a small amount of uplink traffic, time/frequency system resources allocated for the uplink may be wasted. Also, since the PUCCH signal is spread over the entire uplink transmission time slot, further latency reduction may be difficult to achieve.

Figure 1:
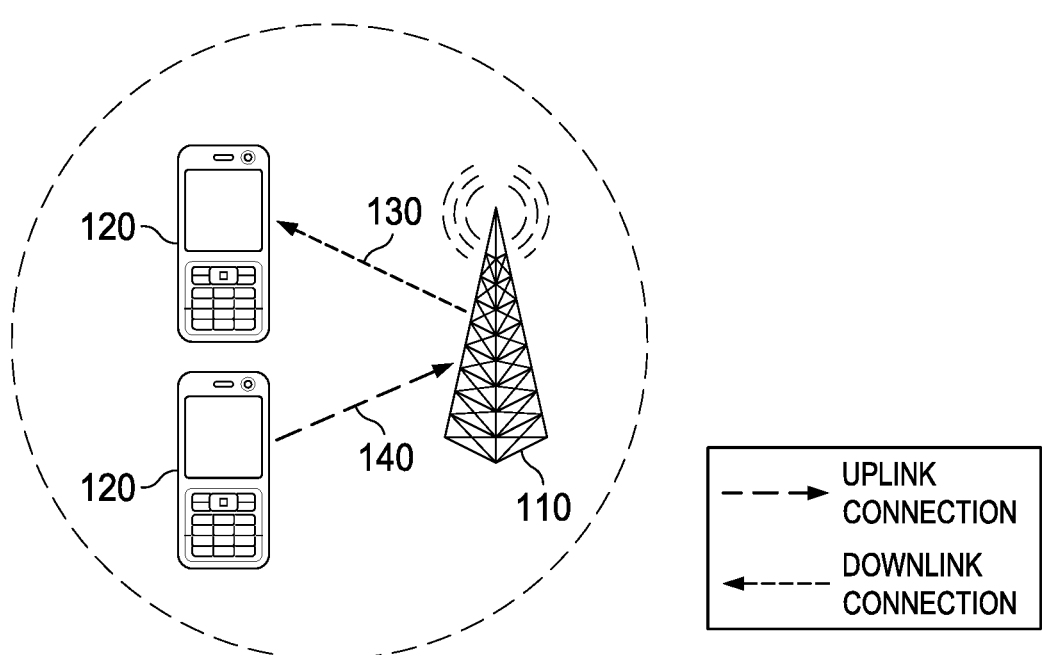
FIG. 1 illustrates downlink and uplink transmission.

Typically, in a modern wireless communications system, such as a Third Generation Partnership Project (3GPP) LTE compliant communications system, a plurality of cells or evolved NodeBs (eNB) (also commonly referred to as NodeBs, base stations (BSs), base terminal stations, communications controllers, network controllers, controllers, access points (APs), and so on) may be arranged into a cluster of cells, with each cell having multiple transmit antennas. Additionally, each cell or eNB may serve a number of users (also commonly referred to as UEs, mobile stations, users, subscribers, terminals, and so forth) based on a priority metric, such as fairness, proportional fairness, round robin, and the like, over a period of time. It is noted that the terms cell, transmission points, and eNB may be used interchangeably, and distinction between cells, transmission points, and eNBs will be made herein where needed. As shown in FIG. 1, the transmission/reception from a controller 110 to a UE 120 is called downlink (DL) transmission/reception 130, and the transmission/reception from a UE 120 to the controller 110 is called uplink (UL) transmission/reception 140.

In OFDM systems, the frequency bandwidth is divided into multiple subcarriers in the frequency domain. In the time domain, one subframe is divided into multiple OFDM symbols. The OFDM symbol may have a cyclic prefix (CP) to avoid inter-symbol interference due to multiple path delays. One resource element (RE) is defined by the time/frequency resource within one subcarrier and one OFDM symbol. A reference signal and other signals, such as a data channel, e.g., physical downlink shared channel (PDSCH), and a control channel, e.g., physical downlink control channel (PDCCH), are orthogonal and multiplexed in different resource elements in the time/frequency domain. Further, the signals are modulated and mapped into resource elements. Using an inverse Fourier transform per each OFDM symbol, signals in the frequency domain are transformed into signals in the time domain, and are transmitted with an added CP to avoid inter-symbol interference.

Figure 2:
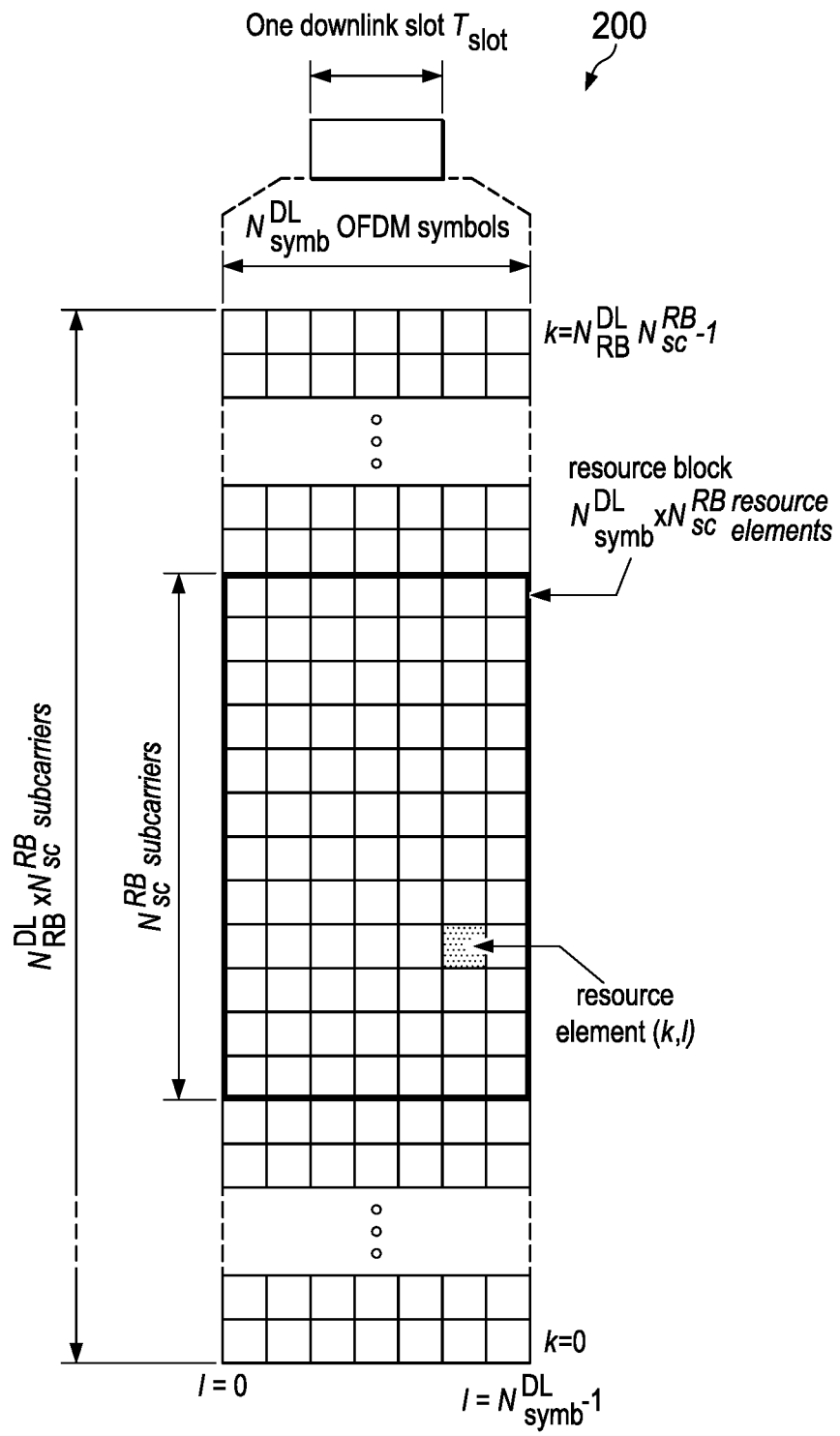
FIG. 2 illustrates example OFDM symbols with normal cyclic prefix.

A resource block (RB) contains a number of REs. FIG. 2 illustrates a downlink slot 200 with example OFDM symbols with a normal CP. There are 14 OFDM symbols labeled from 0 to 13 in each subframe. The symbols 0 to 6 in each subframe correspond to even slots, and the symbols 7 to 13 in each subframe correspond to odd slots. In the figure, only one slot 200 of a subframe is shown. There are 12 subcarriers labeled from 0 to 11 in each RB, and hence in this example, there are 132 REs in a RB. In each subframe, there are a number of RBs, and the number may depend on the bandwidth (BW).

Figure 3:
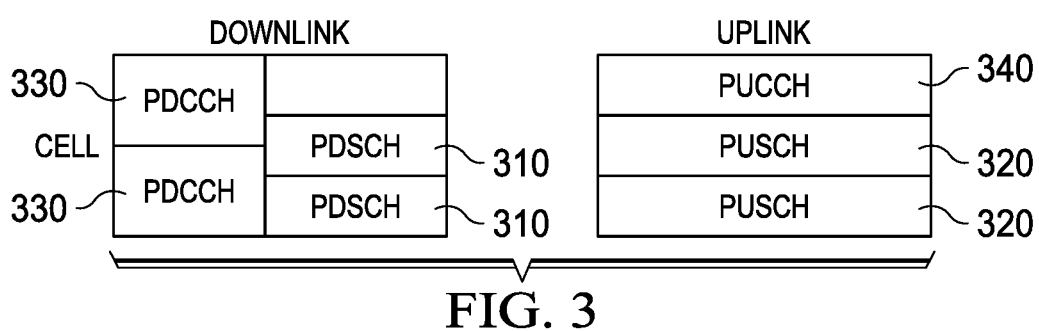
FIG. 3 illustrates example physical data and control channels.

As shown in FIG. 3, the data channels transmitting data packets from the eNB to UEs in the physical layer are called the PDSCH 310, and the data channels transmitting data packets from UEs to the eNB in the physical layer are called the physical uplink shared channel (PUSCH) 320. The corresponding physical control channels transmitted from the eNB to UEs are called the PDCCH 330, which indicates where the corresponding PDSCH 310 and/or PUSCH 320 are in the frequency domain and in which manner the PDSCH 310 and/or PUSCH 320 are transmitted. In FIG. 3, the PDCCH 330 may indicate the signaling for the PDSCH 310 or PUSCH 320. The uplink may include a PUCCH 340. In LTE Release 11, the enhanced PDCCH (EPDCCH) is a downlink control channel having a similar functionality as the PDCCH 330, but the transmission of the EPDCCH may occur in the data region of an LTE Release 8 system, and EPDCCH demodulation is based on the DMRS as opposed to CRS-based demodulation for the PDCCH 330.

Figure 4:
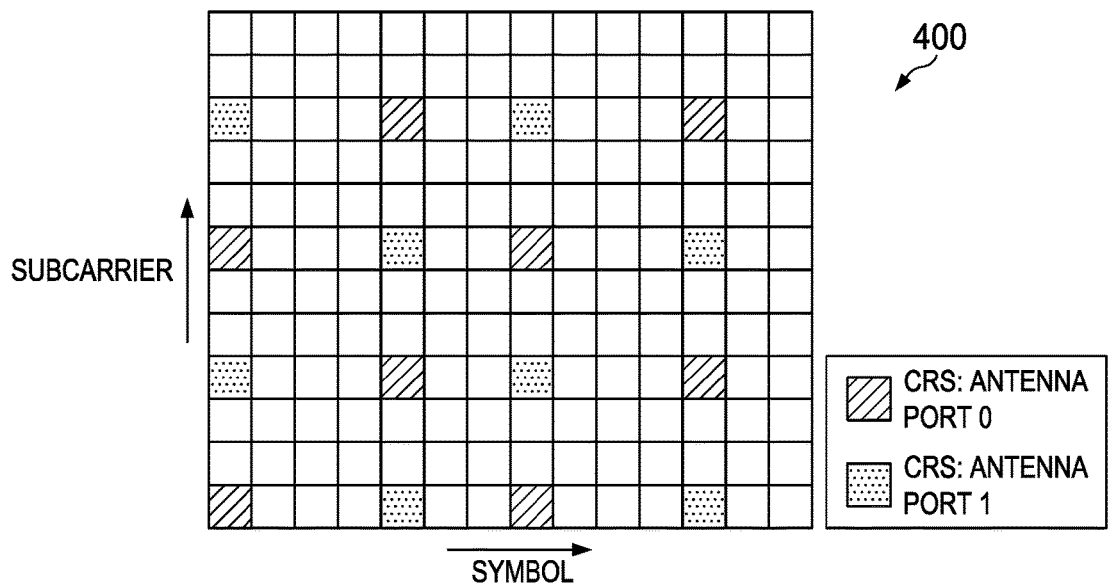
FIG. 4 illustrates an example common reference signal.

In downlink transmission of an LTE Advanced (LTE-A) system, there is a reference signal for the UE to perform channel estimation for demodulation of the PDCCH and other common channels, as well as for measurement and some feedback. This reference signal is the common/cell-specific reference signal (CRS) inherited from the Release 8/9 specification of Evolved Universal Terrestrial Radio Access (E-UTRA), as shown in the subframe 400 of FIG. 4.

A UE-specific dedicated/demodulation reference signal (DMRS) can be transmitted together with the PDSCH channel in Release 10 of E-UTRA. The DMRS is used for channel estimation during PDSCH demodulation. The DMRS can also be transmitted together with the EPDCCH for channel estimation of the EPDCCH by the UE.

Figure 5:
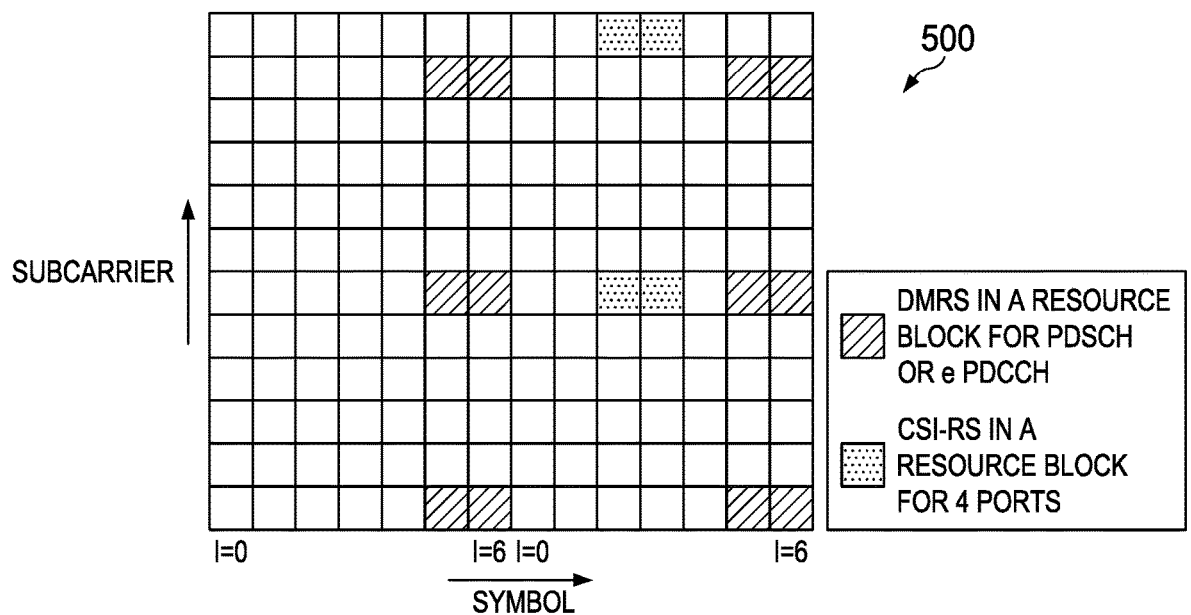
FIG. 5 illustrates an example of CSI-RS and DMRS.

In Release 10, a channel status indicator reference signal (CSI-RS) is introduced in addition to the CRS and DMRS, as shown in the subframe 500 of FIG. 5. CSI-RS is used for Release 10 UEs to measure the channel status, especially for multiple antennas cases. PMI/CQI/RI and other feedback may be based on the measurement of CSI-RS for Release 10 and beyond UEs. PMI is the precoding matrix indicator, CQI is the channel quality indicator, and RI is the rank indicator of the precoding matrix. There may be multiple CSI-RS resources configured for a UE. A specific time/frequency resource and scrambling code may be assigned by the eNB for each CSI-RS resource.

A reference signal (RS), e.g., CRS, CSI-RS or DMRS, may be used for a receiver to estimate the channel impulse response and/or channel power delay profile (PDP). The RS is typically a pseudorandom sequence quadrature phase-shift keying (QPSK) modulated on the subcarriers assigned for RS transmission. Upon receiving the RS, the receiver performs demodulation and descrambling by multiplying the conjugate of the pseudorandom sequence. The resulting signal is then transformed into the time domain by an inverse fast Fourier transform (IFFT) operation to obtain the channel PDP estimation. Further measurements may be performed based on the obtained PDP estimates.

For different tone spacings (i.e., subcarrier spacings), the PDP estimation time range may take different values. For example, if the RS occupies contiguous tones in an OFDM symbol, the time range is equal to the symbol duration. If the RS uniformly occupies one tone out of every six tones in an OFDM symbol, the time range is equal to one sixth of the symbol duration. RS s from different transmitters may be assigned to different sets of subcarriers and hence may be separated in the frequency domain. RS s from different transmitters may also be assigned to different pseudorandom sequences and hence may be separated via low correlation between the pseudorandom sequences. However, RS s may also be assigned to transmit on the same set of subcarriers and may use the same pseudorandom sequence. In these cases, the RSs can strongly interfere with each other. In current LTE systems, the same pseudorandom sequence is generally used in RSs for different cells on the same set of time/frequency resources only if the cells are far enough apart from each other that the RS interference may be reduced to an allowable range. Generally this issue is considered at the network planning stage.

A heterogeneous network (HetNet) may include a macro cell and one or more pico cells, or generally a higher power node/antenna with a larger coverage and lower power node/antennas with smaller coverages. Lower power nodes (or lower power points, picos, femtos, micros, relay nodes, remote radio heads, remote radio units, distributed antennas, etc.) generally are low-power wireless access points that operate in a licensed spectrum. Lower power nodes provide improved cellular coverage, capacity and applications for homes and businesses, as well as metropolitan and rural public spaces.

In the 3GPP Release 10 specification, a component carrier is called a cell. When multiple cells are controlled by the same eNB, cross scheduling of multiple cells may be implemented, because there may be a single scheduler in the same eNB to schedule the multiple cells. With carrier aggregation (CA), one eNB may operate and control several component carriers forming a primary cell (Pcell) and a secondary cell (Scell). In Release 11 design, an eNB may control both a macro cell and a pico cell. In this case, the backhaul between the macro cell and the pico cell may be a fast backhaul. The eNB can control the transmission/reception of both the macro cell and the pico cell dynamically. The PDCCH or EPDCCH transmitted from the macro cells (or points) can be used to indicate the PDSCH or PUSCH transmitted from the pico cell (or points).

Typically, the eNBs are arranged close enough to each other that a decision made by a first eNB may have an impact on a second eNB. For example, the eNBs may use their transmit antenna arrays to form beams towards their UEs when serving the UEs. This may mean that if the first eNB decides to serve a first UE in a particular time/frequency resource, the first eNB may form a beam pointing to that UE. However, the pointed beam may extend into a coverage area of the second eNB and cause interference to UEs served by the second eNB. The inter-cell interference (ICI) for small cell wireless communications systems is commonly referred to as an interference limited cell scenario, which may be different from a noise limited cell scenario seen in large cell wireless communications systems.

In Release 12 and beyond design, the backhaul between the macro cell and the pico cell may not be a fast backhaul. In other words, the backhaul may be a slow backhaul, or any backhaul. In a slow backhaul scenario, generally the PDCCH or EPDCCH transmitted from the macro cells (or points) cannot be used to indicate the PDSCH or PUSCH transmitted from the pico cell (or points).

In a realistic deployment, an eNB may control one or more cells. Multiple remote radio units may be connected to the same baseband unit of the eNB by fiber cable, and the latency between a baseband unit and a remote radio unit may be quite small. Therefore, the same baseband unit can process the coordinated transmission/reception of multiple cells. For example, the eNB may coordinate the transmissions of multiple cells to a UE, which is called coordinated multiple point (CoMP) transmission. The eNB may also coordinate the reception of multiple cells from a UE, which is called CoMP reception. In this case, the backhaul link between these cells with the same eNB is a fast backhaul and the scheduling of the PDSCH transmitted in different cells for the UE can be easily coordinated in the same eNB.

As an extension of the HetNet deployment, densely deployed small cells using low power nodes are considered promising to cope with the mobile traffic explosion, especially for hotspot deployments in indoor and outdoor scenarios. A low power node generally means a node whose transmission power is lower than macro node and BS classes. For example, pico and femto eNBs are both applicable. Small cell enhancements for E-UTRA and E-UTRA networks (E-UTRAN), which is an ongoing study in 3GPP, will focus on additional functionalities for enhanced performance in hotspot areas for indoors and outdoors possibly using densely deployed low power nodes.

A UE typically discovers the surrounding small cells by first identifying the cells through detecting the downlink Primary Synchronization Signal (PSS)/Secondary Synchronization Signal (SSS). The UE then performs signal power measurement based on the downlink CRS of the cells identified from the first step. If the measured signal power is above a certain threshold, the cell discovery is considered successful. For mobility and other network operation optimization purposes, the UE may be required to monitor several cells. To increase the chance the UE is able to discover weaker cells under one or two dominant strong interfering cells, an interference cancellation (IC) technique may be employed in which the dominant strong interfering cells are first discovered and then their PSS/SSS/CRS are reconstructed and subtracted from the UE received signal. Weaker cell discovery is then performed on the remaining signal. In dense small cell scenarios, there could be several strong interferers of similar strength. Under this interference condition, there is little benefit from interference cancellation due to the large number of dominant interferers.

In another small cell deployment scenario, efficient small cell operation may require the introduction of techniques for interference management where some small cells may be silent at certain times. With the reduced interference, it may be possible to maintain or even improve the network throughput performance with reduced network resources, in cases such as where the traffic load is light or medium. If the traffic load increases, on the other hand, the network may activate some inactive small cells to support the increased traffic load. For example, transmission of common signals can be avoided in certain subframes without negative impact to the UE measurements. On the other hand, if such solutions involve cells that stop transmitting for an extended period of time, the discovery of these cells may become even more challenging.

UEs measure the channel status, especially for cases with multiple antennas. PMI/CQI/RI and other feedback may be based on the measurement of a reference signal. There may be multiple reference signal resources configured for a UE. There is a specific time/frequency resource and scrambling code assigned by the eNB for each reference signal resource.

An embodiment device and method divide the frequency resources of system bandwidth, by a network controller, into two sets of frequency resources within a single OFDM symbol. The subcarriers within each set are evenly spaced along the frequency domain. The number and size of subcarriers in the first set of frequency resources are the same as the number and size of subcarriers in the second set of frequency resources. The subcarriers in one set are interleaved with subcarriers in the other set. The entire system bandwidth is covered by the union of the two sets of frequency resources. Parameters related to this frequency resource set division may be semi-statically changed. Use of such a single OFDM symbol may save uplink resources by reducing the number of OFDM symbols used in an uplink transmission. Use of such a single OFDM symbol may also improve the efficiency of transmissions between a UE and a network with which the UE is in communication.

In an embodiment, one set of frequency resources in the single OFDM symbol is designated for pilot signal transmission and the other set is designated for data transmission. When the term "data" is used herein without any qualifier, the term may refer to user-generated information, ACKs, NACKs, or other information that is not used for modulation or demodulation or to indicate channel quality. The term "pilot signal" may refer to information that is used for modulation or demodulation or to indicate channel quality.

Figure 6:
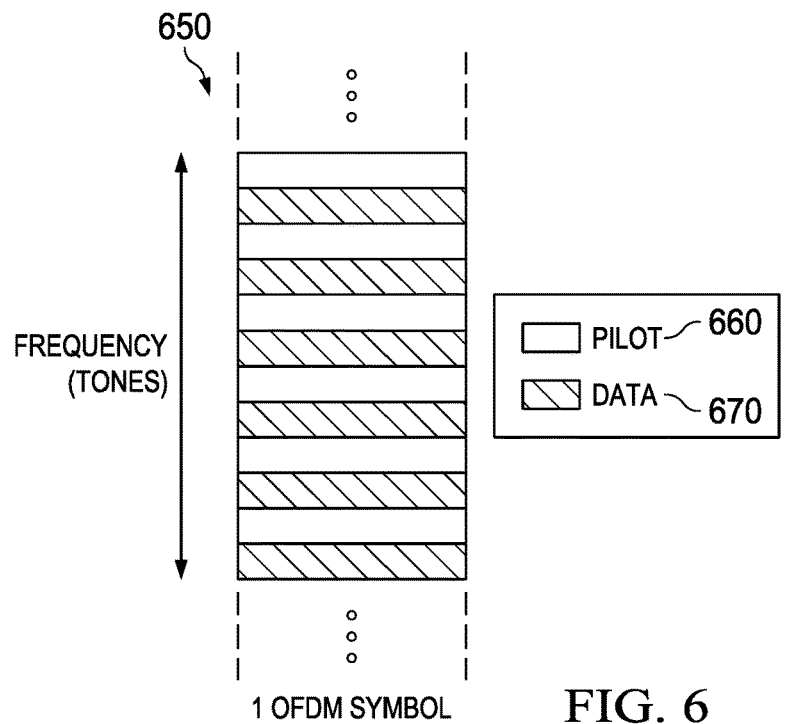
FIG. 6 illustrates an example of division of frequency resource into two sets.

FIG. 6 shows an embodiment of interleaved pilot tones and data tones in such a single OFDM symbol 650. It can be seen that the size of the pilot tones 660 is the same as the size of the data tones 670, that the number of pilot tones 660 is the same as the number of data tones 670, that the pilot tones 660 and data tones 670 are contiguous, and that the pilot tones 660 and data tones 670 fill the entire bandwidth of the single OFDM symbol 650. The pilot signal may reuse the Chu sequence to scramble the frequency tones. The total number of tones for the UE is an integer multiple of the number of resource blocks allocated as described below for uplink transmission of the single OFDM symbol 650.

The network controller may signal information to a UE regarding the semi-static or static configuration of the divided frequency resource sets and the mapping of the data and pilot signals to subcarriers. The signaling may take place through a broadcast message (e.g., the master information block (MIB) or the system information block (SIB)) or a radio resource control (RRC) message. Alternatively, the division configuration and the mapping may be pre-defined in a specification.

Figure 7:
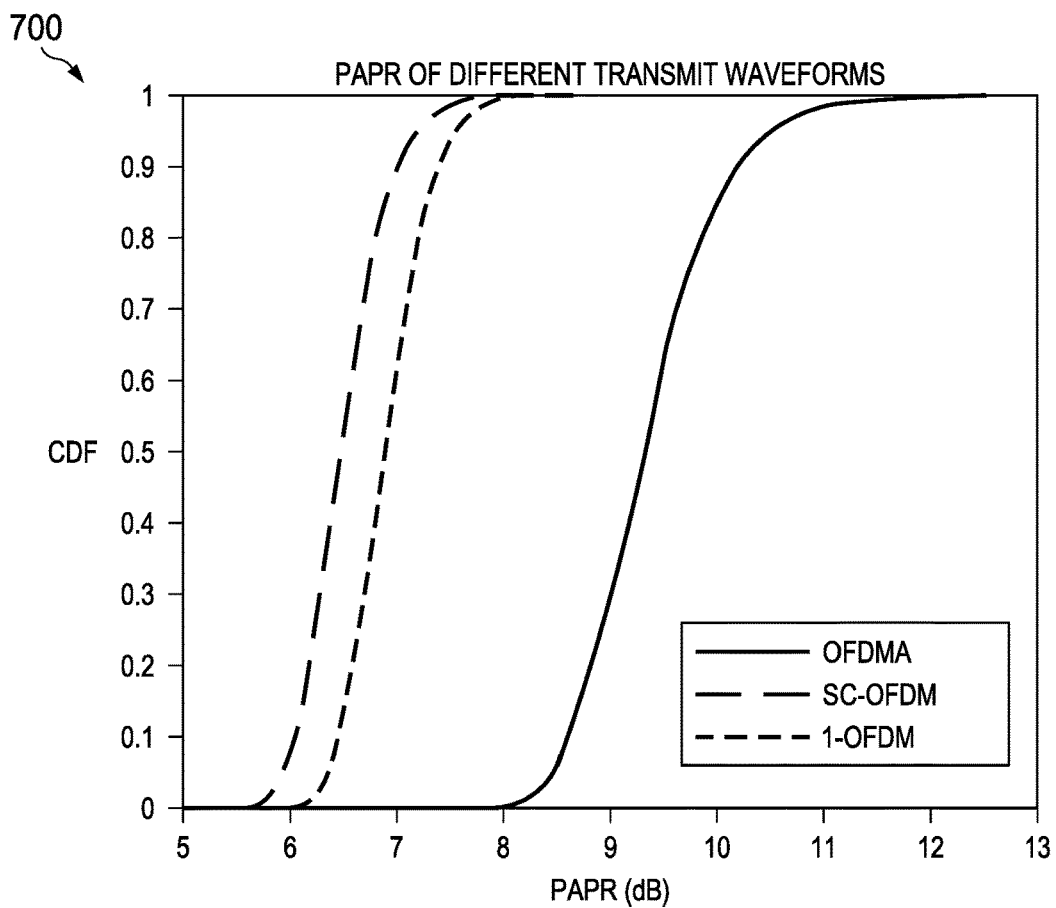
FIG. 7 illustrates an example comparison of PAPR in different transmission schemes.

Transmission of such a single OFDM symbol may maintain the single carrier type of peak-to-average power ratio (PAPR) characteristics. FIG. 7 shows a comparison graph 700 of PAPR between the legacy Single Carrier OFDM (SC-OFDM), Orthogonal Frequency-Division Multiple Access (OFDMA) and the disclosed single OFDM symbol uplink transmission scheme. It can be seen that there is some degradation of PAPR compared to SC-OFDM, but that there is a significant gain compared to OFDMA.

Figure 8:
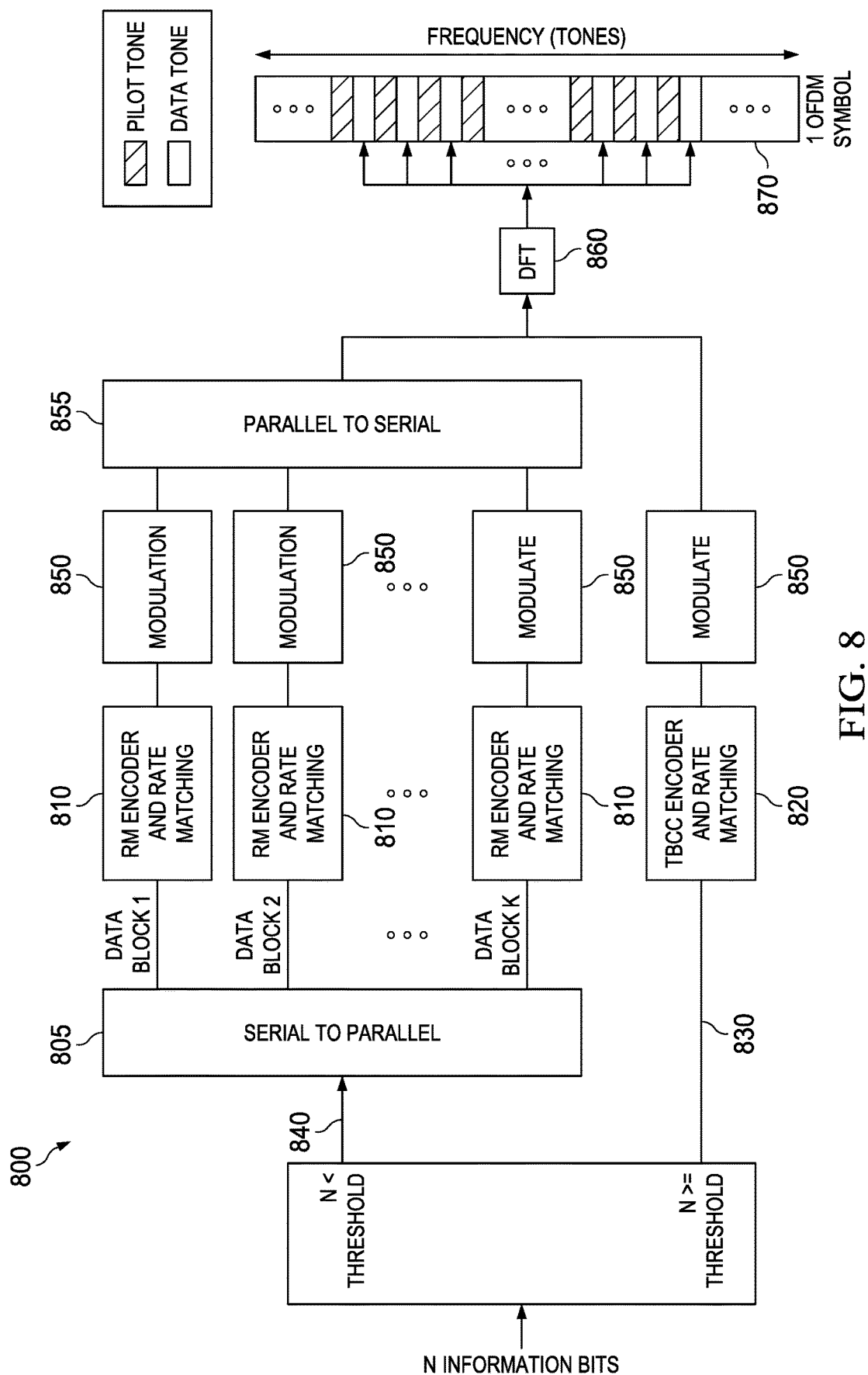
FIG. 8 illustrates a hybrid encoder, modulation, DFT spreading and tone mapping chain.

An embodiment device and method for a hybrid encoder structure may generate a single OFDM symbol such as the single OFDM symbol 650 of FIG. 6. The hybrid encoder may encode information bits, e.g., ACK/NACK bits for multiple downlink transport blocks or carriers, with or without cyclic redundancy check (CRC) bits. FIG. 8 shows the structure of a hybrid encoder 800 and related encoding, modulation and tone mapping chains that may generate a single OFDM symbol 870 similar to the single OFDM symbol 650 of FIG. 6. The hybrid encoder structure includes a set of parallel Reed Muller (32, O) encoders 810 and a Tail-Biting Convolutional Code (TBCC) encoder 820. The Reed Muller (32, O) encoders 810 and the TBCC encoder 820 may be the same as those defined in 3GPP specification 36.212 Release 12, Version 12.5.0, Evolved Universal Terrestrial Radio Access (E-UTRA); Multiplexing and Channel Coding, (June 2015), which is incorporated herein by reference in its entirety.

In the operation of the hybrid encoder 800, the number of information bits, N, for transmission within the single OFDM symbol 870 is compared with a threshold T. The threshold may be signaled to the UE or pre-defined in a specification. An appropriate value for the threshold may be determined experimentally, such as through a trial and error process. That is, observations may indicate that uplink transmission performance with regard to parameters such as error rate and signal-to-noise ratio may depend on the number of information bits to be encoded and on the encoding technology employed. For example, when the number of information bits is below a threshold, such as 80 information bits, Reed Muller encoding may provide better performance. When the number of information bits is above that threshold, TBCC encoding may provide better performance.

In an embodiment, if the number of information bits is greater than or equal to the threshold, N>=T, the information bits are sent through a path 830 to the TBCC encoder 820 and are encoded accordingly. The TBCC encoded bits are rate matched to the available number of channel bits for transmission. The rate matching process may reuse the circular buffer rate matching method as defined in 3GPP 36.212. If the number of information bits is less than the threshold, N<T, the information bits are sent through a path 840 to the set of parallel Reed Muller (32, O) encoders 810 and are encoded accordingly. Before being sent through the set of parallel Reed Muller (32, O) encoders 810, the information bits may be sent through a serial to parallel converter 805.

When the information bits are sent through the set of parallel Reed Muller (32, O) encoders 810, the number of information bits is divided by a number, Z, which corresponds to the maximum number of input bits for a single Reed Muller (32, O) encoder 810, e.g., 10 bits. The result is the number of code blocks the original information bits should be divided into, C=⌈N/Z⌉. If the total number of information bits cannot be evenly divided into these C blocks, N—C* Z code blocks are given one more input bit than the other code blocks. A pre-defined rule may be created to determine which code blocks are to have one more input bit. For example, the first few code blocks may have one more input bit. The C blocks of input bits are encoded by the parallel Reed Muller (32, O) encoders 810, and the encoded bits are rate matched independently. The rate matching process may be done by cyclically extending the encoded bits to the appropriate number of channel bits. The number of channel bits available for one block of encoded bits may be set to be integer multiples of resource blocks of available channel bits assuming QPSK modulation, i.e., integer multiples of 12 channel bits. For example, one block of encoded bits can be rate matched to 3, 4, 6 or 8 resource blocks, resulting in 36, 48, 72 or 96 available channel bits. The set of possible numbers of resource blocks may be signaled to the UE or pre-defined in a specification. Within the set of possible numbers of resource blocks, one number may be defined as the default value. All blocks of encoded bits may be rate matched to the same number of resource blocks of available channel bits. As an example, assume the information contains 50 bits, which results in 5 blocks with 10 information bits for each block. For each code block, the 10 information bits are encoded by a Reed Muller (32, O) encoder 810, producing 32 coded output bits. If each block is signaled in 3 resource blocks which have 36 available channel bits, these 32 coded bits may be rate matched to 36 bits. In total there are 180 output bits from the output of these 5 blocks.

For either encoding path 840 or 830, i.e., the paths that include the set of parallel Reed Muller (32, O) encoders 810 or the TBCC encoder 820, respectively, the network may dynamically signal the UE through downlink control information (DCI) a certain number from a set of possible numbers of resource blocks for the UE to perform rate matching. If this information exists in DCI, the UE may follow the signaling and apply the corresponding rate matching. The following table shows one possible mapping between DCI bits and the number of resource blocks.

TABLE 2

| | | Bits in DCI | | | |
|---|---|---|---|---|---|
| | | '00' | '01' | '10' | '11' |
| Reed Muller (32, O) | Number of resource blocks for one block of information bits | $a_0$ | $a_1$ | $a_2$ | $a_3$ |
| TBCC | Number of resource blocks for total encoded bits | $b_0$ | $b_1$ | $b_2$ | $b_3$ |

$a_0$-$a_3$ are for one block of Reed Muller encoded bits and $b_0$-$b_3$ are for the total TBCC encoded bits. $a_0$-$a_3$ and $b_0$-$b_3$ may be signaled to the UE or pre-defined in a specification.

One mapping rule is to use the starting resource block location of the most recent PDSCH transmission as the starting resource block location for the single OFDM symbol transmission. Another mapping rule is to use the middle resource blocks of the most recent PDSCH transmission as the resource blocks for transmission. Another mapping rule is to align the ending resource block location of the most recent PDSCH with the end resource block location of the single OFDM symbol transmission. One of the above mapping rules may be pre-defined in the network for the UE to follow. The network may support all of the mapping rules, and then the UE may be signaled by the network to follow a specific mapping rule semi-statically through RRC messaging or dynamically through DCI messaging. One DCI signaling example is that two bits are signaled to the UE specifying which rule to follow along with the PDSCH scheduling grant. The following table shows one example of this kind of DCI signaling. Also, certain offset parameters may be signaled to add some offset in determining the single OFDM symbol transmission resource block locations.

TABLE 3

| | Bits in DCI | | | |
|---|---|---|---|---|
| | '00' | '01' | '10' | '11' |
| Mapping rule of starting resource block location | single OFDM symbol transmission starting resource block location = PDSCH starting resource block location | single OFDM symbol transmission resource blocks occupy the middle resource blocks location of its corresponding PDSCH subcarrier location | single OFDM symbol transmission ending resource block location = PDSCH ending resource block location | Other feasible mapping rule |

In the case where the dynamic information of the above resource mapping does not exist in DCI, the UE may proceed according to network configurations. If the network configures the default number of resource blocks, the UE may apply the default amount of rate matching, i.e., the number of resource blocks for one block of encoded bits in the Reed Muller (32, O) encoding case, and the number of resource blocks for total encoded bits in the TBCC encoding case. If the network does not configure the default number of resource blocks, the UE may freely choose the amount of rate matching in terms of resource blocks from the set of possible numbers of resource blocks according to certain criteria, e.g., fading channel selectivity. The network receiver may try to blindly determine the number of resource blocks applied at the UE transmitter, e.g., through pilot frequency tone sequence length detections.

The encoded bits, from the output of either the Reed Muller encoding path 840 or the TBCC encoding path 830, are QPSK-modulated by modulating units 850, discrete Fourier transform (DFT) spread by a DFT unit 860, and mapped onto the data tones of the single OFDM symbol 870. In some embodiments, two DFT units 860 may be present, one for data and one for pilot signals. In the case of the Reed Muller encoding path 840, the encoded bits may be sent through a parallel to serial converter 855 after passing through the modulating units 850 and before entering the DFT unit 860. The amounts of resource blocks are determined as described above.

In an embodiment, the starting location of the resource blocks is determined through a pre-defined mapping rule.

The single OFDM symbol uplink transmission may reuse the LTE legacy PUCCH and PUSCH power control mechanism.

In an embodiment, single OFDM symbol uplink transmission may be deployed under several different scenarios depending on the baseband processing speed and/or other hardware capabilities of the UE and the network with which the UE is communicating and/or depending on the amount of uplink traffic. In a first scenario, there is no uplink traffic except the ACK/NACK for the downlink traffic. In a second scenario, the processing speed of the UE side is above a pre-defined UE processing speed threshold, but the processing speed of the network side is below a pre-defined network processing speed threshold. In a third scenario, the processing speed of the network is above the network processing speed threshold, but the processing speed of the UE is below the UE processing speed threshold. In a fourth scenario, the processing speed of the UE and the processing speed of the network are both above their respective thresholds. FIGS. 9a-9d depict such deployment scenarios.

FIG. 9a shows a case where there is no uplink traffic except the ACK/NACK for the downlink traffic. In such a case, single OFDM symbol uplink transmission can be used to save unused PUSCH and PUCCH time/frequency resources. That is, the PUSCH and the PUCCH are not transmitted at all in such a scenario. Instead, only the single OFDM symbol is transmitted to carry ACK/NACK information. Resources may be saved under this scenario since only the single OFDM symbol is transmitted rather than the 14 OFDM symbols that are transmitted in a typical uplink transmission. The use of the single OFDM symbol uplink transmission is not dependent on the processing speed of the UE or the network in this scenario.

In this scenario, a first downlink transmission occurs at block 902. A guard period then occurs at block 904. A first single OFDM symbol uplink transmission then occurs at block 906. That is, the transmission at block 906 may be the transmission of a single OFDM symbol such as the single OFDM symbol 650 of FIG. 6 or the single OFDM symbol 870 of FIG. 8. In the example of FIG. 9*a*, the first downlink transmission that occurred at block 902 was not properly received by the UE, so the UE sends a NACK 908 to the network in the single OFDM symbol uplink transmission that occurs at block 906. The NACK 908 indicates that the first downlink transmission should be repeated at a later time, as indicated by arrow 910. A second downlink transmission occurs at block 912, and another guard period occurs at block 914. A second single OFDM symbol uplink transmission then occurs at block 916. In this example, the second downlink transmission that occurred at block 912 was properly received by the UE, so the UE sends an ACK 918 to the network in the single OFDM symbol uplink transmission that occurs at block 916. The ACK 918 indicates that a new downlink transmission can occur at a later time, as indicated by arrow 920. At block 922, a retransmission occurs for the first downlink transmission that occurred at block 902 and that was not properly received by the UE. Another guard period occurs at block 924. A third single OFDM symbol uplink transmission then occurs at block 926 for an ACK/NACK for the retransmission that occurred at block 922. At block 928, the new downlink transmission occurs, as prompted by the ACK 918 in the second single OFDM symbol uplink transmission that occurred at block 916.

In other deployment scenarios, depicted in FIGS. 9*b*-9*d*, typical uplink traffic is present in addition to the ACK/NACK. In these scenarios, single OFDM symbol uplink transmission may be used to achieve lower latency in transmissions between the UE and the network. In an embodiment, the scenario that is deployed depends on the network's and the UE's baseband hardware processing speed and/or other capabilities. In these scenarios, transmissions of new data or retransmissions of previously transmitted data based on the transmission of ACKs and NACKs may occur in a manner substantially similar to the manner described above and so will not be described again in detail herein. Single OFDM symbol uplink transmissions in these scenarios may be the transmission of a single OFDM symbol such as the single OFDM symbol 650 of FIG. 6 or the single OFDM symbol 870 of FIG. 8.

In an embodiment, the UE reports its hardware capabilities, and in particular its processing speed, to the network. The network compares the reported UE processing speed to the known UE processing speed threshold. Based on the comparison of the UE speed and the UE speed threshold relative to the network speed and the network speed threshold, the network determines a location in time for the single OFDM symbol uplink transmission relative to other uplink transmissions. The network then instructs the UE to transmit the single OFDM symbol at the determined location in time. When the UE transmits on the uplink, the UE transmits the single OFDM symbol as instructed by the network.

FIG. 9*b* depicts a case where the processing speed of the UE is above the UE processing speed threshold, but the processing speed of the network is below the network processing speed threshold. In such a case, single OFDM symbol uplink transmissions 932 may be configured immediately before the normal uplink PUCCH/PUSCH transmissions 934. That is, if the UE has sufficient processing speed, the UE may be able to generate an ACK/NACK before sending its normal uplink transmissions 934. This early transmission of the ACK/NACK allows a slower network side more time to prepare a retransmission. As described above, the UE sends the ACK/NACK for a downlink transmission through the single OFDM uplink symbol 932, and the network receives and decodes the ACK/NACK and builds a retransmission or a new downlink transmission based on the decoded ACK/NACK results.

FIG. 9*c* depicts a case where the processing speed of the network is above the network processing speed threshold, but the processing speed of the UE is below the UE processing speed threshold. In such a case, single OFDM symbol uplink transmissions 942 may be configured immediately after the normal uplink PUCCH/PUSCH transmissions 944. That is, because of the UE's inadequate processing speed, the UE may not be able to decode downlink transmissions quickly. Placing the single OFDM symbol uplink transmissions 942 after the normal uplink PUCCH/PUSCH transmissions 944 may allow the UE sufficient time to decode the downlink transmissions. As described above, the UE sends the ACK/NACK for a downlink transmission through the single OFDM uplink symbol 942, and the network receives and decodes the ACK/NACK and builds a retransmission or a new downlink transmission based on the decoded ACK/NACK results.

FIG. 9*d* depicts a case where the processing speed of the UE and the processing speed of the network are both above their respective thresholds. In such a case, single OFDM symbol transmissions 952 may be configured to occur at some point during the normal uplink PUCCH/PUSCH transmissions 954. That is, the single OFDM symbol transmissions 952 may occur in a middle portion of the PUCCH/PUSCH transmissions 954. Such a scenario provides an early transmission of the ACK/NACK as in the scenario of FIG. 9*b* as well as sufficient time for the UE to decode the downlink transmissions as in the scenario of FIG. 9*c*. Compared to the scenarios of FIGS. 9*b* and 9*c*, the lowest latency may be achieved with this configuration. As described above, the UE sends the ACK/NACK for a downlink transmission through the single OFDM uplink symbol 952, and the network receives and decodes the ACK/NACK and builds a retransmission or a new downlink transmission based on the decoded ACK/NACK results. An additional downlink retransmission 960 is shown in this example.

In the scenario of FIG. 9*a*, the single OFDM symbol may be transmitted instead of the PUCCH and the PUSCH. In the scenarios of FIGS. 9*b*, 9*c*, and 9*d*, the single OFDM symbol may be transmitted in an early portion, a late portion, or a middle portion, respectively, of a PUCCH and/or PUSCH transmission. In the latter scenarios, the PUCCH and/or the PUSCH may be modified to allow the inclusion of the single OFDM symbol in an uplink transmission. For example, an OFDM symbol that would otherwise be used for the PUCCH and/or the PUSCH may be used instead for transmission of the single OFDM symbol disclosed herein.

Although the above descriptions apply mainly to LTE systems, the concepts may be applicable in other systems such as high speed packet access (HSPA) systems or WiFi systems.

Figure 10:
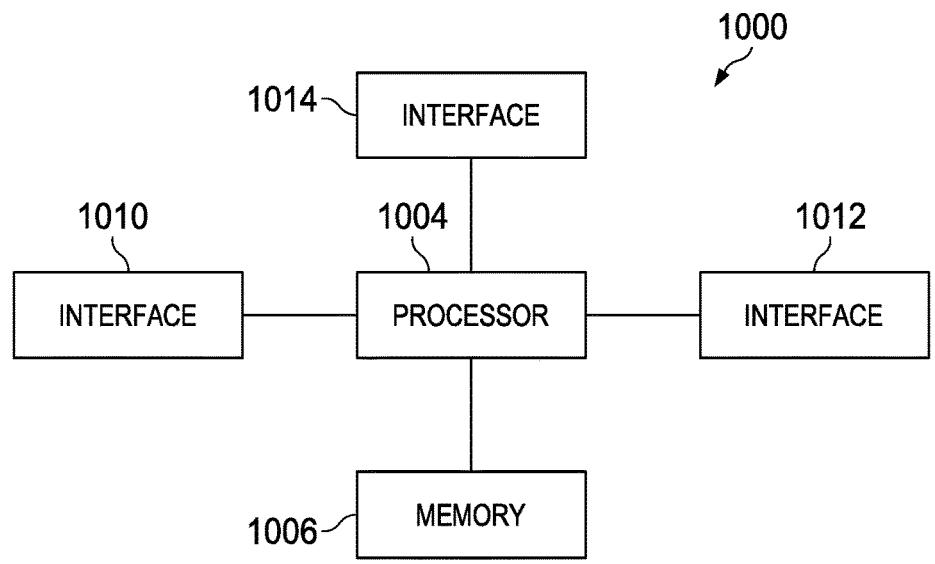
FIG. 10 illustrates a block diagram of an embodiment processing system for performing methods described herein.

FIG. 10 illustrates a block diagram of an embodiment processing system 1000 for performing methods described herein, which may be installed in a host device. As shown, the processing system 1000 includes a processor 1004, a memory 1006, and interfaces 1010-1014, which may (or may not) be arranged as shown in the figure. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in the figure, such as long term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
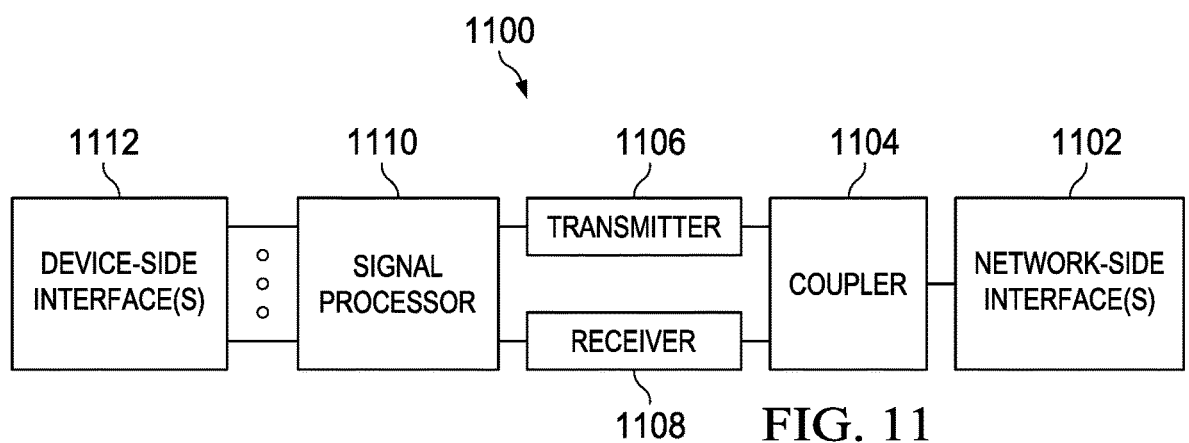
FIG. 11 illustrates a block diagram of a transceiver adapted to transmit and receive signaling over a telecommunications network.

In some embodiments, one or more of the interfaces 1010, 1012, 1014 connects the processing system 1000 to a transceiver adapted to transmit and receive signaling over the telecommunications network. FIG. 11 illustrates a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a dividing unit/module, an instructing unit/module, and/or a reporting unit/module. The respective units/modules may be hardware, software, or a combination thereof. For instance, one or more of the units/modules may be an integrated circuit, such as field programmable gate arrays (FPGAs) or application-specific integrated circuits (ASICs).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for managing uplink transmission, the method comprising:

transmitting, by a network controller, to a user equipment (UE), downlink traffic over a physical downlink shared channel (PDSCH);

transmitting, by the network controller, to the UE, a message instructing the UE to transmit uplink data signaling over a first set of frequencies in a single orthogonal frequency division multiplexing (OFDM) symbol and to transmit uplink pilot signaling over a second set of frequencies in the single OFDM symbol, the first set of frequencies and the second set of frequencies being different from one another, wherein individual frequencies in the first set of frequencies over which the uplink data signaling is transmitted are interleaved with individual frequencies in the second set of frequencies over which the uplink pilot signaling is transmitted, the first set of frequencies of the single OFDM symbol excluding uplink pilot signaling and uplink control signaling, the second set of frequencies of the single OFDM symbol excluding uplink data signaling; and transmitting, by the network controller, to the UE, the message instructing the UE to transmit acknowledgement or negative acknowledgement (ACK/NACK) signaling for the downlink traffic over the single OFDM symbol during a given time period, rather than over a physical uplink shared channel (PUSCH) or a physical uplink control channel (PUCCH) corresponding to the PDSCH, in response to the UE determining that the UE has no uplink data signaling, other than the ACK/NACK signaling, to transmit to the network controller during the given time period.

2. The method of claim 1, wherein a configuration of frequency resources in the single OFDM symbol is provided to the UE via at least one of:
 a broadcast message from the network controller;
 a radio resource control message from the network controller; and
 a definition in a specification.

3. The method of claim 1, wherein the network controller configures a transmission time of the single OFDM symbol according to at least one of:
 an amount of uplink traffic; and
 processing speeds of the UE and of a network of which the network controller is a component, wherein the network controller receives information regarding a processing speed of the UE from the U E.

4. The method of claim 3, wherein, when the processing speed of the UE is above a threshold for the UE, and when the processing speed of the network is below a threshold for the network, the network controller instructs the UE to transmit the single OFDM symbol before PUSCH and PUCCH transmissions.

5. The method of claim 3, wherein, when the processing speed of the UE is below a threshold for the UE, and when the processing speed of the network is above a threshold for the network, the network controller instructs the UE to transmit the single OFDM symbol after PUSCH and PUCCH transmissions.

6. The method of claim 3, wherein, when the processing speed of the UE is above a threshold for the UE, and when the processing speed of the network is above a threshold for the network, the network controller instructs the UE to transmit the single OFDM symbol in a middle portion of PUSCH and PUCCH transmissions.

7. A hybrid communications controller comprising:
 a processor; and
 a non-transitory computer readable storage medium storing programming for execution by the processor, the programming including instructions to:
 transmit, to a user equipment (UE), downlink traffic over a physical downlink shared channel (PDSCH);
 transmit, to the UE, a message instructing the UE to transmit uplink data signaling over a first set of frequencies in a single orthogonal frequency division multiplexing (OFDM) symbol and to transmit uplink pilot signaling over a second set of frequencies in the single OFDM symbol, the first set of frequencies and the second set of frequencies being different from one another, wherein individual frequencies in the first set of frequencies over which the uplink data signaling is transmitted are interleaved with individual frequencies in the second set of frequencies over which the uplink pilot signaling is transmitted, the first set of frequencies of the single OFDM symbol excluding uplink pilot signaling and uplink control signaling, the second set of frequencies of the single OFDM symbol excluding uplink data signaling; and
 transmit, to the UE, the message instructing the UE to transmit acknowledgement or negative acknowledgement (ACK/NACK) signaling for the downlink traffic over the single OFDM symbol during a given time period, rather than over a physical uplink shared channel (PUSCH) or a physical uplink control channel (PUCCH) corresponding to the PDSCH, in response to the UE determining that the UE has no uplink data signaling, other than the ACK/NACK signaling, to transmit to the hybrid controller during the given time period.

8. The hybrid communications controller of claim 7, wherein the hybrid communications controller is configured for comparing a number of information bits received by the hybrid communications controller to a threshold, wherein, when the number of information bits is less than the threshold, the hybrid communications controller is configured for sending the information bits to a first chain comprising a set of parallel Reed Muller (32, O) encoders, a rate matching unit and a modulation unit, wherein, when the number of information bits is greater than or equal to the threshold, the hybrid communications controller is configured for sending the information bits to a second chain comprising a Tail-Biting Convolutional Code (TBCC) encoder, a rate matching unit and a modulation unit, and wherein the hybrid communications controller is configured for mapping an output of the first chain or the second chain onto the first set of frequencies and the second set of frequencies in the single OFDM symbol.

9. The hybrid communications controller of claim 8, wherein the hybrid communications controller configures a transmission time of the single OFDM symbol according to at least one of:
 an amount of uplink traffic; and
 processing speeds of the UE and of a network of which the hybrid communications controller is a component, wherein the hybrid communications controller receives information regarding a processing speed of the UE from the UE.

10. The hybrid communications controller of claim 9, wherein, when the processing speed of the UE is above a threshold for the UE, and when the processing speed of the network is below a threshold for the network, the hybrid communications controller instructs the UE to transmit the single OFDM symbol before PUSCH and PUCCH transmissions.

11. The hybrid communications controller of claim 9, wherein, when the processing speed of the UE is below a threshold for the UE, and when the processing speed of the network is above a threshold for the network, the hybrid communications controller instructs the UE to transmit the single OFDM symbol after PUSCH and PUCCH transmissions.

12. The hybrid communications controller of claim 9, wherein, when the processing speed of the UE is above a threshold for the UE, and when the processing speed of the network is above a threshold for the network, the hybrid communications controller instructs the UE to transmit the single OFDM symbol in a middle portion of PUSCH and PUCCH transmissions.

13. A method for uplink transmission, the method comprising:

receiving, by a user equipment (UE), downlink traffic over a physical downlink shared channel (PDSCH);

receiving, by the UE, from a network controller, a message instructing the UE to transmit uplink data signaling over a first set of frequencies within a single orthogonal frequency division multiplexing (OFDM) symbol and uplink pilot signaling over a second set of frequencies within the single OFDM symbol, wherein individual frequencies in the first set of frequencies over which the uplink data signaling is transmitted are interleaved with individual frequencies in the second set of frequencies over which the uplink pilot signaling is transmitted, the first set of frequencies of the single OFDM symbol excluding uplink pilot signaling and uplink control signaling, the second set of frequencies of the single OFDM symbol excluding uplink data signaling; and transmitting, by the UE, to the network controller, acknowledgement or negative acknowledgement (ACK/NACK) signaling for the downlink traffic over the single OFDM symbol during a given time period, rather than over a physical uplink shared channel (PUSCH) or a physical uplink control channel (PUCCH) corresponding to the PDSCH, in response to the UE determining that the UE has no uplink data signaling, other than the ACK/NACK signaling, to transmit to the network controller during the given time period.

14. The method of claim 13, wherein the UE is provided with a configuration of the first set of frequencies and the second set of frequencies within the single OFDM symbol via at least one of:

a broadcast message;

a radio resource control message; and a definition in a specification.

15. The method of claim 13, further comprising:

reporting, by the UE, a processing speed of the UE to a network with which the UE is in communication;

receiving, by the UE, instructions from the network regarding a transmission time for the single OFDM symbol, wherein the instructions are based on the processing speed of the UE; and transmitting, by the UE, according to the instructions, the single OFDM symbol at one of:

a time before the UE transmits a PUSCH and a PUCCH;

a time after the UE transmits a PUSCH and a PUCCH; and a time during which the UE transmits a PUSCH or a PUCCH.

* * * * *